UNITED STATES PATENT OFFICE.

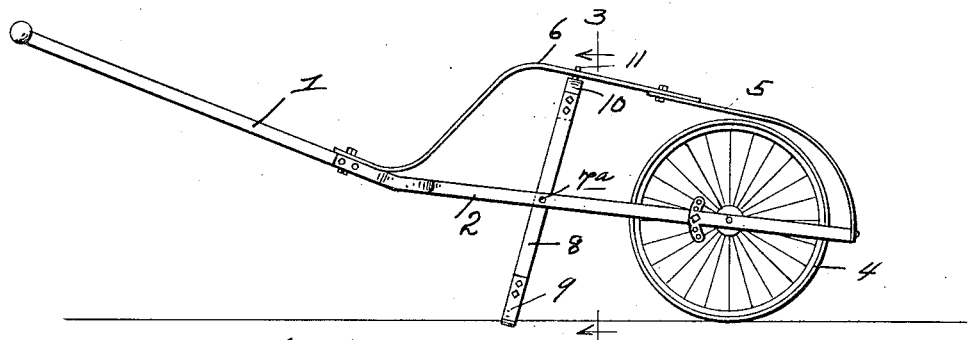
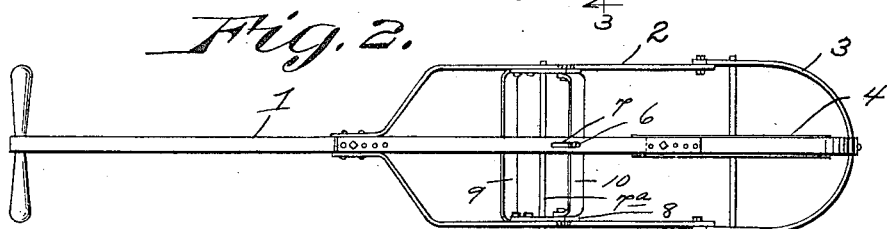
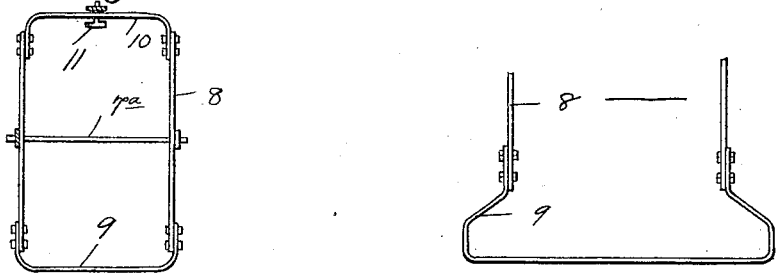
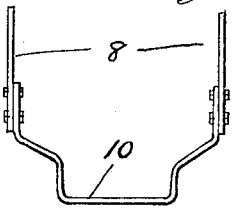
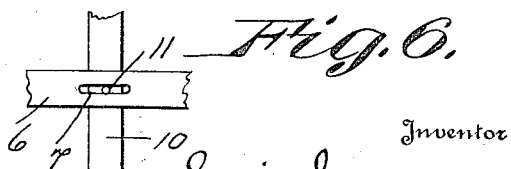

LEWIS INMAN, OF MILLVILLE, MASSACHUSETTS.

HAND-WEEDER.

1,288,904.  Specification of Letters Patent.  Patented Dec. 24, 1918.

Application filed March 18, 1918.   Serial No. 223,205.

*To all whom it may concern:*

Be it known that I, LEWIS INMAN, a citizen of the United States, residing at Millville, in the county of Worcester and State of Massachusetts, have invented new and useful Improvements in Hand-Weeders, of which the following is a specification.

My present invention pertains to hand appliances for garden-work; and it consists in the hand weeder or cultivator hereinafter described and definitely claimed.

In the accompanying drawings:

Figure 1 is a side elevation of my novel weeder.

Fig. 2 is a top plan of the same.

Fig. 3 is a section taken transversely on the line 3—3 of Fig. 1 and showing the reversible knife frame.

Figs. 4 and 5 show different types of knives that may be employed.

Fig. 6 is an enlarged fragmentary plan view showing the preferred mode of adjustably fixing the knife frame to the upper bar or brace of the main frame.

Similar numerals of reference designate corresponding parts in all of the views of the drawings.

The handle 1 of my novel weeder is connected at its forward end to expanded metallic frame bars 2, and the said frame bars 2 have adjustably mounted at their forward ends the ends of a yoke 3 in which is suitably mounted a ground wheel 4; the adjustable fixing of the yoke 3 to the frame bars 2 being desirable in that the same provides convenient means for adjusting the knives to the character of the garden to be weeded.

Connected to the yoke 3 and reaching rearwardly over the wheel 4 is a brace 5, and arranged in lapped relation to and adjustably connected with the brace 5 is a brace 6, having a longitudinal slot 7 and connected at its rear end to the handle 1, also, by preference, in an adjustable manner as illustrated.

Mounted between the frame bars 2 is an adjustable knife frame which is made up of a transverse shaft 7ª and bars 8 fixed thereto; the ends of the shaft being journaled in the frame bars 2 so as to permit of swinging movement of the knife frame. One of the knives 9 carried by said frame is connected at its ends with the outer side of the bars 8, and the other knife 10 is connected at its end to the inner sides of the frame bars 8, this arrangement being resorted to in order to provide the single frame with knives of different lengths. I would also have it understood that the end portions of the knives are made round in order to work close to growing plants without liability of injuring the same; also, that the knives may be of the simple shape shown in Figs. 1 to 3 or of the shape shown in Figs. 4 and 5 or any other desired shape without involving departure from the scope of my claimed invention.

Each of the blades 9 and 10 is provided at its middle with a preferably threaded aperture for the engagement of a preferably threaded bolt 11 designed to be carried by the knives alternately and to rest in the slot 7 with a view to permitting reversing of the knife frame when desired, while preventing casual disengagement of said frame from the brace 6 which serves to limit the movement of the knife frame. Manifestly said bolt 11 may be mounted in either knife 9 or 10 that is opposed for the time being to the brace 6. It will also be noted in this connection that by reason of the knives being of different lengths the short knife may be used in narrow rows and the long knife in comparatively wide rows. It will also be noted that my novel weeder may be made to readily work around large stones in the field, the device being adapted to be readily canted to one side or the other as occasion demands.

In the practical use of my novel weeder, the operator causes the device to slide along with the edge of the working knife just below the surface of the ground, the arrangement of the knife frame being such that as the machine moves toward the right in Fig. 1, the working portion of the lower blade will assume about the angle shown from the horizontal. Thus the knife is enabled to thoroughly break up the surface of the ground and at the same time uproot any weeds that are in its path. In this connection, I would say that the working edges of the knives are not sharp, it being desirable to uproot the weeds rather than to cut through the roots.

The connection of the knives 9 and 10 to the bars 8 of the knife frame is preferably an adjustable one in order to permit of the knives being set for the condition of ground encountered, etc.

The arrangement of the bolt 11 in the slot 7 of brace 6 enables the knife frame to oscillate incidental to the operation of the weeder, and also to fix the angle of the working blade as before described.

It will be gathered from the foregoing that my novel weeder is simple and inexpensive in construction and is adapted to be operated with but little effort on the part of the operator and without liability of injuring the growing plants.

Having described my invention, what I claim and desire to secure by Letters Patent, is:

1. In a weeder, the combination of side frame bars, a yoke connected with and constructed to be adjustably fixed with respect to said frame bars, a ground wheel mounted in said yoke, a brace connected to the yoke and reaching upwardly and rearwardly over the ground wheel, a rear brace adjustably fixed to the first-named brace and also to the handle, the said handle, and a knife frame pivoted between the side frame bars and having knives and also having a projection for alternate use on the bars removably arranged in a longitudinal slot of the second-named brace.

2. A wheeled weeder, comprising a frame, a ground wheel mounted in the forward portion thereof, a handle connected with the rear portion of the frame, apertured brace means reaching over the ground wheel and connected with the front and rear portions of the frame, and a knife frame pivoted to swing vertically and longitudinally between the sides of the frame and having a projection on its upper portion disposed in the aperture of the brace means.

3. A wheeled weeder, comprising a frame, a ground wheel mounted in the forward portion of the frame, apertured brace means reaching over the ground wheel and connected with the front and rear portions, and a knife frame pivoted between the first named frame and having knives and also having a projection for use on the bars and being arranged in a movable manner in a slot of the second named frame.

In testimony whereof I have hereunto set my hand in presence of two subscribing witnesses.

LEWIS INMAN.

Witnesses:
 EDGAR L. SPAULDING,
 EVELYN W. SPAULDING.

Copies of this patent may be obtained for five cents each, by addressing the "Commissioner of Patents, Washington, D. C."